United States Patent [19]
Koves

[11] Patent Number: 5,538,700
[45] Date of Patent: Jul. 23, 1996

[54] PROCESS AND APPARATUS FOR CONTROLLING TEMPERATURES IN REACTANT CHANNELS

[75] Inventor: William J. Koves, Hoffman Estates, Ill.

[73] Assignee: UOP, Des Plaines, Ill.

[21] Appl. No.: 362,824

[22] Filed: Dec. 22, 1994

[51] Int. Cl.⁶ .................................................. F28D 7/16
[52] U.S. Cl. .................. 422/200; 422/198; 165/166; 165/167
[58] Field of Search ..................... 422/198, 200; 165/166, 167

[56] References Cited

U.S. PATENT DOCUMENTS

| | | | |
|---|---|---|---|
| 4,693,807 | 9/1987 | Westerman et al. | 208/108 |
| 4,973,401 | 11/1990 | Dang Vu et al. | 208/134 |
| 5,047,217 | 9/1991 | Dang Vu et al. | 422/200 |
| 5,073,352 | 12/1991 | Dang Vu et al. | 422/213 |
| 5,114,776 | 5/1992 | Cesaroni | 165/166 |
| 5,186,909 | 2/1993 | Dang Vu et al. | 422/213 |
| 5,193,611 | 3/1993 | Hesselgreaves | 165/166 |
| 5,316,628 | 5/1994 | Collin et al. | 165/166 |
| 5,413,872 | 5/1995 | Faigle | 166/166 |

*Primary Examiner*—Timothy McMahon
*Attorney, Agent, or Firm*—Thomas K. McBride; John G. Tolomei

[57] ABSTRACT

A reactor arrangement and process for indirectly contacting a reactant stream with a heat exchange stream uses an arrangement of corrugated heat exchange plates and a plate containing protrusions between the corrugated plates to control temperature conditions by varying the number and/or the projection of the protrusions between the plates. The reactor arrangement and process of this invention may be used to operate a reactor under isothermal or other controlled temperature conditions. The variation in protrusion arrangements within a single heat exchange section is highly useful in maintaining a desired temperature profile in an arrangement having a cross-flow of heat exchange medium relative to reactants. The protrusion arrangement offers a simplified method to eliminate or minimize the typical step-wise approach to isothermal conditions.

17 Claims, 3 Drawing Sheets

PROCESS AND APPARATUS FOR CONTROLLING TEMPERATURES IN REACTANT CHANNELS

FIELD OF THE INVENTION

This invention relates to chemical reactors for the conversion of a reaction fluid while indirectly exchanging heat with a heat exchange fluid.

BACKGROUND OF THE INVENTION

In many industries, like the petrochemical and chemical industries for instance, the processes employ reactors in which chemical reactions are effected in the components of one or more reaction fluids under given temperature and pressure conditions. Many of these reactions generate or absorb heat, to various degrees, and are, therefore, exothermic or endothermic. The heating or chilling effects associated with exothermic or endothermic reactions can positively or negatively affect the operation of the reaction zone. The negative effects can include among other things: poor product production, deactivation of the catalyst, production of unwanted by-products and, in extreme cases, damage to the reaction vessel and associated piping. More typically, the undesired effects associated with temperature changes will reduce the selectivity or yield of products from the reaction zone.

One solution for controlling the changes in temperature associated with the heats of various reactions has been to operate several adiabatic reaction zones with intermediate heating or cooling between the different reaction zones. In each adiabatic reaction stage, all of the heat liberated or absorbed during the reaction is transmitted directly to the reactive fluid and the reactor internals. The degree of heat release and the tolerance for temperature change determines the total number of adiabatic reactor zones required in such arrangements. Each zone or adiabatic stage of reaction adds significantly to the overall cost of such a process due to the equipment expense of adding piping and heaters or coolers for intermediate stages of heat transfer to a reactant that passes through the reaction zones. Therefore the number of adiabatic steps is limited and such systems offer at best a stepwise approach to isothermal or other controlled temperature conditions. Moreover, the breaking up of a reaction zone into a series of reactors with intermediate heating or cooling of reactants, especially interferes with reactor arrangements that have continual addition and withdrawal of catalyst from the reaction zone.

Other solutions to the problem of temperature control under the influence of different heats of reaction have employed direct or indirect heating or cooling within the reaction zone. Direct heating or cooling utilizes a compensating reaction having a directionally different heat requirement that occurs simultaneously with the principal reaction. The counter balancing reaction offsets heat release or heat adsorption from the principal reaction. One of the simplest forms of such an arrangement is an endothermic process that uses oxidation of hydrogen to heat reactants in an endothermic reaction.

Another solution has been the indirect heating of reactants and/or catalysts within a reaction zone with a heating or cooling medium. The most well known catalytic reactors of this type are tubular arrangements that have fixed or moving bed catalysts. The geometry of tubular reactors poses layout constraints that require large reactors or limit throughput.

Indirect heat exchange has also been accomplished using thin plates to define channels that alternately retain catalyst and reactants between a heat transfer fluid for indirectly heating or cooling the reactants and catalysts. Heat exchange plates in these indirect heat exchange reactors can be flat or curved and may have surface variations such as corrugations to increase heat transfer between the heat transfer fluids and the reactants and catalysts. Although the thin heat transfer plates can, to some extent, compensate for the changes in temperature induced by the heat of reaction, the indirect heat transfer arrangements are not able to offer the complete temperature control that would benefit many processes by maintaining a desired temperature profile through a reaction zone.

Many hydrocarbon conversion processes will operate more advantageously by maintaining a temperature profile that differs from that created by the heat of reaction. In many reactions, the most beneficial temperature profile will be obtained by substantially isothermal conditions. In some cases, a temperature profile directionally opposite to the temperature changes associated with the heat of reaction will provide the most beneficial conditions. An example of such a case is in dehydrogenation reactions wherein the selectivity and conversion of the endothermic process is improved by having a rising temperature profile, or reverse temperature gradient through the reaction zone.

A reverse temperature gradient for the purposes of this specification refers to a condition where the change in temperature through a reaction zone is opposite to that driven by the heat input from the reaction. In an endothermic reaction, a reverse temperature gradient would mean that the average temperature of the reactants towards the outlet end of the reaction zone have a higher value than the average temperature of the reactants at the inlet end of the reaction zone. In an opposite manner, a reverse temperature gradient in an exothermic reaction refers to a condition wherein reactants towards the inlet end of the reactor have a higher average temperature than the reactants as they pass toward the outlet end of the reaction section.

It is an object of this invention to provide a reactor that offers greater temperature control of reactants by the indirect heating or cooling of a reaction stream by a heat exchange fluid within a reaction zone.

It is a further object of this invention to provide a process and apparatus used for indirect heat exchange of a reactant stream with a heat exchange stream for controlling the temperature profile through the reaction zone.

Another object of this invention is to provide a process that uses indirect heat exchange with a heat exchange fluid to maintain substantially isothermal conditions or a reverse temperature gradient through a reactor.

BRIEF SUMMARY OF THE INVENTION

This invention is a chemical reactor and a process for using a chemical reactor that employs an arrangement of heat exchange plates within the reactor that will maintain reactor temperatures within a desired range during the reaction. The heat exchange plates define alternate channels for the heat exchange fluid and the reactants. Heat transfer is controlled in this invention by locating a heat transfer adjustment plate in the center of channels that convey a heat transfer fluid through the reactor. The adjustment plate defines protrusion that extend into the heat transfer channels and reduce or increase turbulence with the channel. Raising or lowering the turbulence in the heat exchange channel increases or decreases the heat transfer coefficient across the heat exchange plates that separate the reactant channels from the heat transfer channels. In this manner the degree of indirect heat exchange along the length of the reactor can be adjusted to maintain a desired temperature profile.

The heat adjustment plate is susceptible to a variety of configurations. The only essential requirement is that the plate have a surface that creates a varied amount of turbulence as the heat transfer fluid contacts different portions of the plate. The plate can induce variations in turbulence by changing the surface roughness over different portions of the plate, using a varied number and size of a perforations over the plate. The more effective arrangements of this invention use the adjustment plate to define protrusions that extend from the plate and project into the flow path of the heat exchange fluid.

The number, shape and amount of protrusions can be adjusted over the surface of the plate to provide the desired degree of temperature adjustment within the reactant channels. For example in an endothermic reaction more or larger protrusions are provided in the heat exchange channels that heat the portion of the reactant channels located toward the outlet of the reactor. The increased number of protrusions toward one end of the reactor selectively increases heat exchange at the outlet end of the reactant channels and provides the necessary heat input to maintain a constant temperature throughout the reactant channels. The number of protrusions provided over the plate can be adjusted as needed to suit the endothermicity or exothermicity of the reaction occurring in the reactant channels.

This invention will promote the control of temperatures through a reaction zone. Preferably this invention will maintain the desired inlet and outlet temperatures within 10° F. and more preferably within 5° F. of a desired temperature profile through the reactant channels. Where isothermal conditions are desired the inlet and outlet temperature are equal, such that one requirement of the substantially isothermal conditions described in this invention is that the mean inlet and outlet temperature vary by no more than 10° F. and preferably by no more than 5° F.

A process and catalyst reactor arrangement that uses this invention may employ single or multiple reaction zones within a reactor vessel. The advantage of this invention is that the reactor vessel can provide the desired temperature gradient without intermediate withdrawal and recycling of reactants or heat exchange medium between the inlet and outlet of the reactor. The multiple reaction zones within the reactor vessel can be used to accommodate variations in the heat adjustment plate.

Accordingly, in an apparatus embodiment, this invention is a reactor for controlling temperature profiles in a reaction zone. The reactor includes a plurality of spaced apart heat exchange plates. Each heat exchange plate has an extended length and defines a boundary of a heat exchange flow channel on one side of the plate and a boundary of a reaction flow channel on an opposite side of the plate. Means are provided for passing a reaction fluid along through a plurality of the reaction flow channels defined by the plates along a first flow path and means are provided for passing a heat exchange fluid through a plurality of the heat exchange channels defined by the plates along a second flow path. A heat adjustment plate in each heat exchange channel define a plurality of protrusions that project into the heat exchange channels. The protrusions have an area of projection into the heat exchange flow channel that varies over the length of the plate to produce varied turbulence across the channels.

Preferably each heat exchange plate defines corrugations and the heat adjustment plate is sandwiched between the corrugations in the heat exchange channel.

In another embodiment, this invention is a process for controlling the temperature of a reactant stream in a chemical reaction by indirect heat exchange with a heat exchange fluid across a multiplicity of plate elements. The process comprises passing a heat exchange fluid from a heat exchange inlet to a heat exchange outlet through a first set of elongated channels formed by a first side of a plurality of heat exchange plates. A reactant stream passes from a reactant inlet to a reactant outlet through a second set of channels formed by a second side of the heat exchange plates. The process exchanges heat between the heat exchange fluid and the reactant stream by contacting the heat exchange fluid with corrugations formed by the heat exchange plates. In addition to the corrugations the heat exchange fluid in the heat exchange channels contacts a heat adjustment plate that contains a plurality of protrusions to vary the heat transfer coefficient within the heat transfer channels.

The process may be useful in a wide variety of catalytic reactions. This invention is most beneficially applied to catalytic conversion process having high heats of reaction. Typical reactions of this type are hydrocarbon conversion reactions that include: the aromatization of hydrocarbons, the reforming of hydrocarbons, the alehydrogenation of hydrocarbons, and the alkylation of hydrocarbons. Specific hydrocarbon conversion processes to which this invention are suited include: catalytic dehydrogenation of paraffins, reforming of naphtha feed streams, aromatization of light hydrocarbons and the alkylation of aromatic hydrocarbons.

The reaction zones for the process of this invention may indirectly contact the reactants with the heat exchange fluid in any relative direction. Thus, the flow channels and inlet and outlets of the reaction zones may be designed for cocurrent, countercurrent, or crossflow of reactant and heat exchange fluid. Preferred process arrangements for practicing this invention will pass reactants in cross-flow to the heat exchange fluid. Cross-flow of reactants is generally preferred to minimize the pressure drop associated with the flow of reactants through the reactor. For this reason, a cross-flow arrangement can be used to provide the reactants with a shorter flow path across the reaction zone.

Effective use of the adjustment plate in a cross-flow arrangement of reactants and heat exchange fluids requires attention to pressure drop considerations. Changing the heat transfer along the path of the reactant stream requires a variation in the protrusions along a path transverse to the flow of the heating medium. Increasing the size or number of protrusions on one side of the heat exchange channels to increase heat transfer can increase the resistance to flow through the same portion of the channel. Increased flow resistance and resulting pressure drop can redistribute fluid flow across the channel and redirect a greater flow of heat exchange fluid back to the portion of the heat exchange channels where less heating is desired. If not considered in the design of the channels or heat adjustment plate this increased flow will increase heat transfer and undo the effect of the increased protrusions. Accordingly in a cross-flow arrangement the protrusions should increase turbulence without adversely redistributing the flow of heat exchange fluid with increased pressure drop. Increasing turbulence independent of pressure drop may be accomplished by adjusting the shape and configuration of the protrusions. Heat transfer is effectively enhanced by using protrusions that direct the heat exchange fluid into impact with surfaces of the channels and heat transfer plates. Turbulence and pressure drop may be decoupled by using protrusions that maximize the redirection and impact of the heat exchange fluid with plate surfaces at one end of the heat exchange channel and using protrusion that maintain pressure drop without redirection at the other end of the channel. The incorporation of perforations in the protrusions provides another method of increasing turbulence and without raising pressure drop.

The shorter flow path, particularly in the case of the reactant stream contacting heterogeneous catalysts, reduces overall pressure drop of the reactants as they pass through the reactor. Lower pressure drops can have a two-fold advantage in the processing of many reactant streams. Increased flow resistance i.e., pressure drop, can raise the overall operating pressure of a process. In many cases, product yield or selectivity is favored by lower operating pressure so that minimizing pressure drop will also provide a greater yield of desired products. In addition, higher pressure drop raises the overall utility and cost of operating a process.

It is also not necessary to the practice of this invention that each reactant channel contain only one heat adjustment plate. Possible configurations of the reaction section may place two or more heat adjustment plates within each reactant channel to offer greater control to turbulence within a channel.

Additional embodiments, arrangements, and details of the invention are disclosed in the following detailed description of the invention.

DETAILED DESCRIPTION OF THE INVENTION

By its very design, the reactor according to this invention has the advantage of maintaining, with simple means, desired temperature profiles including isothermal or reverse gradient temperature conditions during the flow of the reactive fluid in the reactor, by means of a heat transfer medium. This invention aids in the effective use of catalytic materials by controlling temperatures in a manner that enhances performance of the catalytic reaction.

The process and reactor arrangement may use homogeneous or heterogeneous catalysts. Homogeneous catalyst will typically comprise liquid catalysts that flow through reaction channels along with the reactants and are separated for recovery and recycle outside of the reaction zone. This reactor arrangement provides particular benefits with heterogeneous catalysts that are typically retained within the reactant channels by the corrugated plates and permeable members that retain the catalyst but permit the flow of reactants therethrough. In most cases, the heterogeneous catalyst will comprise particulate material retained between the plates and the reactor may be arranged to permit the continuous addition and withdrawal of particulate material while the reactor is on stream.

Figure 1:
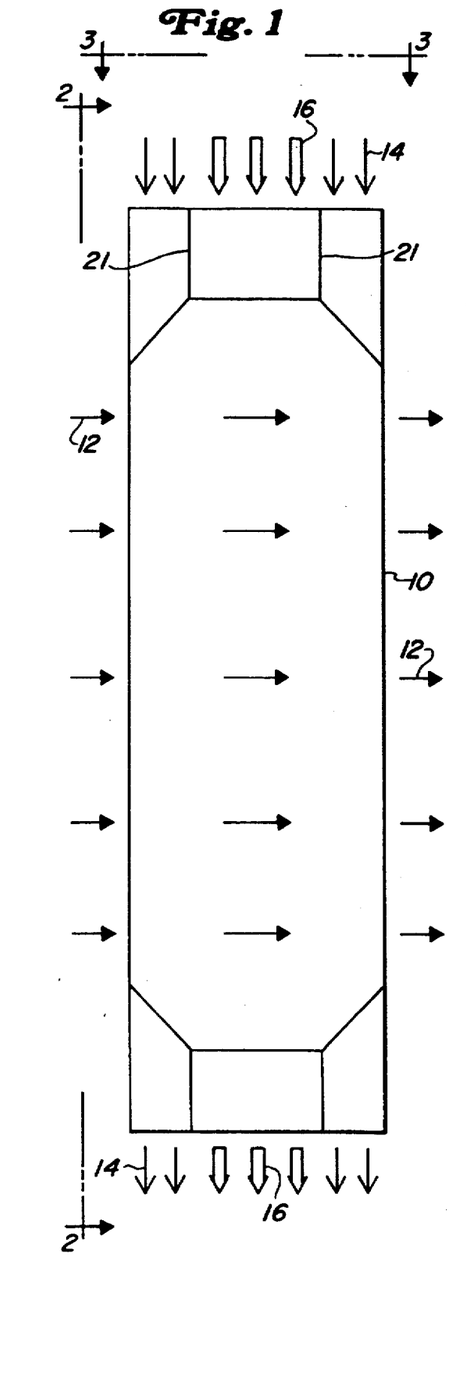
FIG. 1 is a schematic representation of a catalytic reaction section of this invention showing a preferred direction for the circulation of fluids and catalyst.
Figures 2, 3:
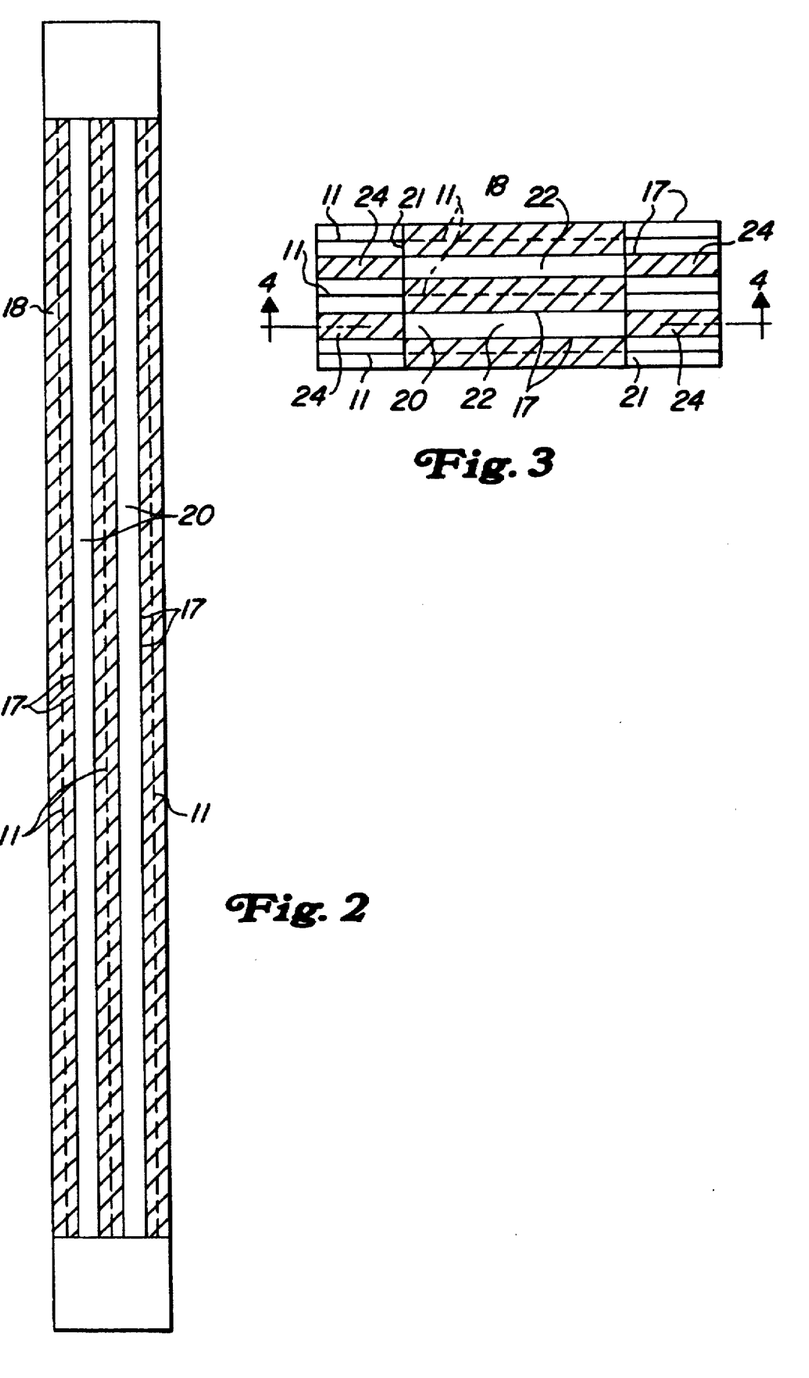
FIG. 2 is a side view of the catalytic reaction section taken along lines 2—2 of FIG. 1.
FIG. 3 is a top view of the reactor section of FIG. 1 taken along lines 3—3.

The type and details of the reactor arrangements contemplated in the practice of this invention is best appreciated by a reference to the drawings. FIG. 1 is a schematic representation of a catalytic reactor section 10 designed to effect a catalytic reaction on a reactant fluid while using indirect heat exchange with a heat transfer fluid to maintain favorable reaction temperatures as the reactant fluid flows through the catalytic reaction section. The catalytic reaction section comprises a stack of heat exchange plates 17 of the type represented in FIGS. 2 and 3. Each plate 17 is stacked in a spaced apart relationship next to adjacent plates 17 to form two circulation systems, the first one for a flow of a reactive fluid 12 and the second one for flow of heat exchange fluid 14. When present a flow of catalyst 16 will also pass through the first circulation system. Together FIGS. 1 through 3 define a specific circulation system, wherein the reactive fluid and the heat exchange fluid respectively, flow in crosswise directions, i.e. perpendicular and through alternate channels formed between adjacent plates 17. In FIG. 1, a reactant fluid passes horizontally in the direction indicated by arrows 12. The heat exchange fluid flows transversely to the reactant fluid in the direction indicated by arrows 14. Catalyst also passes through the reactant channels with the reactants in the direction and at a location indicated by arrows 16. FIG. 2 shows via a side view, the arrangement of alternate heat exchange channels 18 and reactant channels 20 formed by the plurality of heat exchange plates 17. Reactant channels 20 are open at the edge of the reactor to isolate the reactant channels from the heat exchange channels. Where the reactant channels also contain a particulate catalyst material, a suitable screen covers the open sides of reactant channels 20 to retain the catalyst. The sides of heat exchange channels 18 are sealed to confine the heat exchange fluid for vertical flow through the reaction section. FIG. 2 also shows the heat adjustment plate 11 as dashed line centered in the closed off heat exchange channels. The heat exchange plates preferably define continuous channels for both the reactant and the heat exchange fluid over the length and width of the reaction section. The continuous heat exchange channels maintain the heat exchange fluid in contact with the heat adjustment plate over the length of the reaction section.

Figure 4:
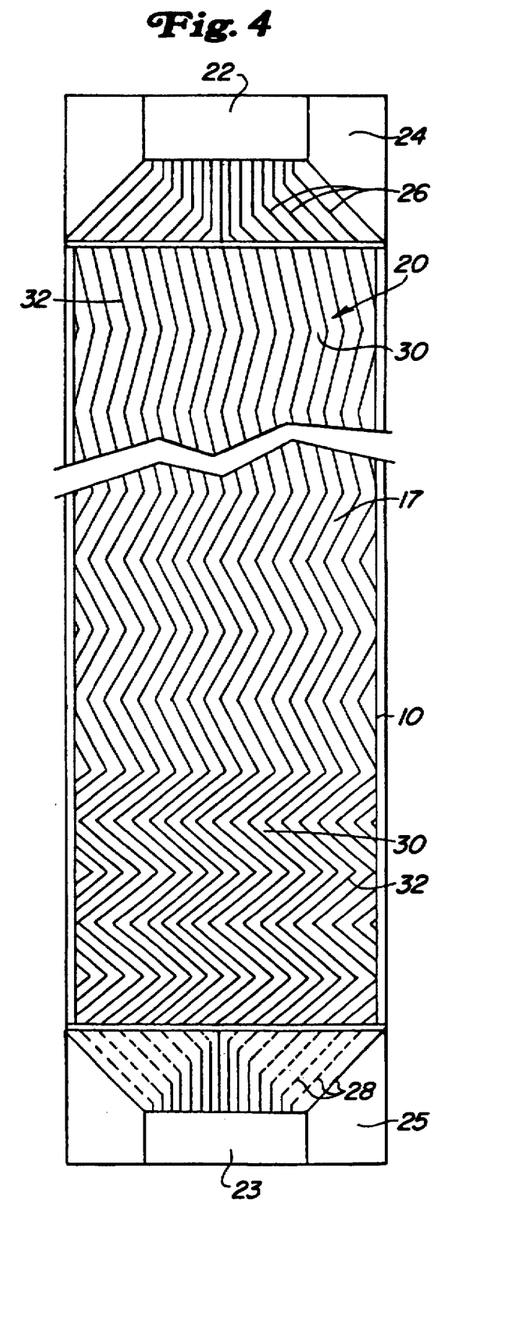
FIG. 4 is a section of the reaction system shown in FIG. 1 taken along line 4—4 of FIG. 3.

The same alternate arrangement of heat exchange channels and reactant channels is shown in FIG. 3. As indicated by FIG. 3, the outer ends 19 of the heat exchange channels 18 are open to admit fluid into the heat exchange channels. The outer section 24 of reactant channels 20 are closed off to keep the heat exchange fluid out of the reactant channels. A partition 21 separates the central portion of heat exchange and reactant channels from the outer ends. Inside partition 21 the central portion of heat exchange channels 18 are closed to fluid flow. Closing the center of heat exchange channels 18 permits the center section of the reaction section to receive a particulate catalyst and distribute the catalyst to the open central portion 20 of reactant channels 20. Thus, catalyst passing vertically through the reactant channels enters the reaction section through the central portion 22 of the reactant channels. The vertically flowing reactants and catalyst exit the reaction section through a similar arrangement at the bottom of the reaction section. As shown in FIG. 4, central portion 22 of the reactant channels distributes catalyst to a series of baffles 26 that distribute the catalyst to the reactant channels. A series of baffles 28 at the bottom of reaction section 10 channel catalyst to a central portion 23 of the reactant channels for the withdrawal of catalyst from reaction section 10.

As depicted in FIG. 4, plates 17 preferably have a corrugated surface creating peaks 30 and valleys 32 that separate reactant channels 22 as well as heat exchange channels 18 into subchannels. In a yet further preferred form of this invention, the corrugations of plate 17 may have a varied pitch that further alters heat transfer coefficients down the length of the reactor to provide additional adjustment in the degree of heating or cooling provided by the indirect heat exchange.

Suitable heat exchange plates for this invention will comprise any plates allowing a high heat transfer rate and which are easily secured into a reaction section in a stable configuration that readily retains the heat transfer adjustment plate. The plates may be formed into curves or other configurations, but flat plates are generally preferred for stacking purposes. Thin plates are preferred and typically have a thickness of from 1 to 2 mm. The plates are typically composed ferrous or non-ferrous alloys such as stainless steels.

As depicted in FIG. 4 the preferred form of the invention will a corrugated plate arrangement. The corrugated plates are particularly useful in positioning the heat adjustment plate. Adjacent corrugations are arranged in an alternating pattern so that the peaks of the corrugations contact where the corrugation patterns cross to maintain the spacing between the plates and define an intersecting pattern of diagonal channels. In this manner the general herring bone pattern on the faces of opposing corrugated plates will extend in opposite directions and the opposing plate faces may be placed in contact with each other to form the flow channels and provide structural support to the plate sections.

As shown in FIG. 4 the corrugations may be varied to effect further control of the heat transfer coefficient between the across the heat exchange plates. The variation in the pitch of the corrugations further assists in maintaining a desired temperature profile through the reaction section. The plate arrangement of FIG. 4 represents a typical corrugation pattern for an exothermic or endothermic process. At the upper inlet end the pitch angle of the corrugations is small, i.e. the principle direction of the corrugations approach a parallel alignment with the heat exchange fluid flow. At the lower end of the plate where the heat exchange fluid exits, the pitch angle of the corrugations is wide to increase relative heat transfer, i.e. the principle direction of the corrugations approach a perpendicular or transverse alignment with respect to the heat exchange fluid flow. Corrugation pitch angles can be in a range of from greater than 0° to less than 90° degrees. Typically the corrugation pitch angle from an inlet to an outlet section of a plate will range from about 10° to 80°, and more typically in a range of about 15° to 60°. In a particularly preferred arrangement, the plates will make an angle of less than 30° at the inlet end of the plate and an angle of more than 35° at the outlet end of the plate. The varying corrugations may be formed in a continuous plate section or the plate section of the type shown in FIG. 4 may be made from several plates having corrugations at different pitch angles.

Preferably the reactant channels in which the reactant fluid circulates, includes a heterogenous catalyst in the form of particles. The catalyst particles typically comprise grains of a small size. The particles may take on any kind of shape, but usually comprise small spheres or cylinders.

When flowing through reactant channels 20, the reactant fluid undergoes a catalytic reaction accompanied by a liberation or an absorption of heat. The function of the heat exchange fluid circulating in the heat exchange channels is to convey the heat to be added to or removed from the reactant fluid, in order to maintain favorable reaction conditions. Such conditions can again include isothermal conditions during the circulation of the afore-mentioned reactive fluid in the catalytic reactor or a reverse temperature gradient. The heat exchange fluid is either a gas or a liquid, depending on the specific operating conditions of each process.

The specific heat transfer relationship for the plate exchange is established by the fundamental equation expressing heat transfer between two fluids. This relationship is as follows:

$$P = h \times S \times LMTD$$

where:

P is the amount of heat exchanged, h is the local or overall heat transfer coefficient, S is the heat exchange area between fluids, and LMTD is the logarithmic mean temperature difference.

The logarithmic mean temperature difference is readily determined by the desired temperature difference at any point along the plate.

For a series of corrugated plates defining alternate channels of catalyst particles and heat exchanger fluid, the local or overall heat transfer coefficient can be calculated by using the following equation:

$$h = f(a, e, dp)$$

where a is the pitch angle of the corrugations, e is the distance between two plates 17, and dp is the equivalent diameter of catalyst particles.

Appropriate values of h can be established by modeling or computed using known correlations for establishing heat transfer coefficients over corrugated surfaces and, where present, through particle beds. Correlations for localized heat transfer through particle beds may be found in Leva, Ind. Eng. Chem., 42, 2498 (1950). Correlations for heat transfer along corrugations are presented in AIChE Symposium Series No. 295 Vol. 89 Heat Transfer Atlanta (1993).

The area of exchange between the reactive fluid and the auxiliary fluid can be calculated by using the equation:

$$S = \epsilon \times n \times l \times L$$

where: $\epsilon$ is a correction factor for the elongation of the plates resulting from the corrugations, n is the number of plates in contact with both heating and reactant fluids, l is the plate width, and L is the plate length.

By varying the number of plates and the characteristics of the corrugations, especially the pitch angle of the corrugations, the corrugations provide means for maintaining desired temperature conditions in the reactant fluid flow direction.

In addition to control of heat transfer coefficients offered by the heat exchange plates, the primary mechanism taught by this invention for controlling heat transfer between the heat transfer channels and the reactant channels is the heat transfer adjustment plate 11. The function of the heat transfer adjustment plate is to vary the turbulence of the heat exchange fluid passing through the heat transfer channels. The plate is formed or retains elements on its surface that are irregular in shape and induce the desired degree of turbulence at specific locations in the heat transfer channels. The configuration of the irregularities for inducing turbulence can take on a variety of different shapes. Typically, the irregularities will be in the form of protrusions that will project outwardly from the plate into the flow path of the heat exchange fluid. As the heat exchange fluid contacts the projecting protrusions, turbulence is raised and heat transfer between the fluid and the surface of the heat transfer plate is increased. The change in the heat transfer coefficient at a given location of the channels by the increased degree of turbulence is readily calculated by methods well known to those skilled in the art. Accordingly, the variation in the heat transfer coefficient achieved by the pattern of surface irregularities on the heat transfer adjustment plate can be readily calculated or determined experimentally.

Figure 5:
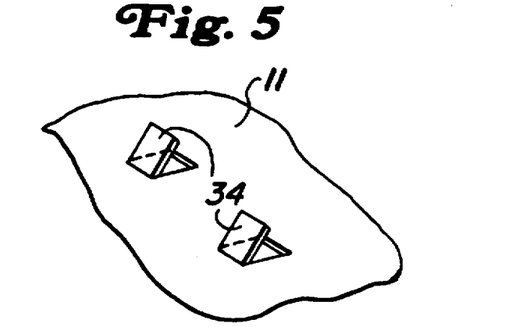
FIG. 5 is a section of a heat adjustment plate of this invention.

In a preferred form of the invention, the surface irregularities are formed by punching laterally extending tabs from the heat adjustment plate material and bending the tabs into the flow path of the heat exchange fluid. FIG. 5 shows a heat adjustment plate 11 from which tabs 34 have been bent outwardly. Adjustment of the turbulence induced by the tabs can be varied by changing the projection of the tabs into the flow path of the heat exchange fluid or increasing the number of tabs in portions of the heat exchange channels where additional heat transfer is desired.

Figure 6:
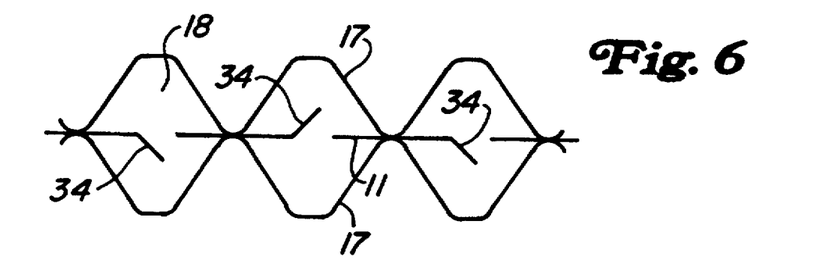
FIG. 6 is a section of the channels formed by corrugated plates containing the heat adjustment plate of this invention.
Figure 7:
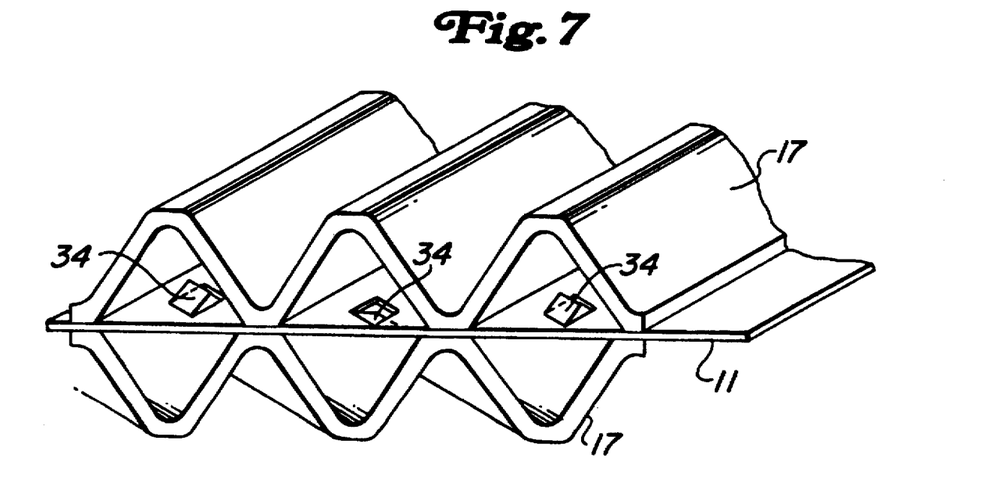
FIG. 7 is a perspective view of the channels and heat adjustment plate shown in FIG. 6.

FIG. 6 depicts a typical cross-section of a corrugated heat exchange channel containing a heat adjustment plate of the type depicted in FIG. 5. The corrugation peaks of heat exchange plate 17 retains heat adjustment plate 11 in a sandwich configuration. Heat adjustment plate 11 generally crosses through the center of heat adjustment channels 18. Heat adjustment tabs 34 occupy a central portion of the heat adjustment channel 18. Preferably heat adjustment tabs 34 will not contact the heat adjustment plate 17. Suitable heat adjustment plates can have an imperforate surface to prevent exchange of heat transfer fluid across the heat adjustment plate. Preferably, the heat adjustment plate will have perforations associated with the protrusions to permit passage of the heat exchange fluid across the heat adjustment plate. FIG. 6 also shows a preferred form for the tabs where alternate tabs project away from opposite sides of heat adjustment plate 11. FIG. 7 depicts a three dimensional arrangement of the channels and heat adjustment plate shown in FIG. 6.

Heat adjustment plate 11 will preferably comprise a thin plate having a thickness similar to that of the heat transfer plates. The heat adjustment plate operates in two ways to provide additional heat transfer across the heat exchange plates. Increased turbulence from the protrusions on the heat adjustment plate will indirectly increase heat transfer between the heat transfer fluid and the heat transfer plate. In addition, heat and adjustment plate 11 provides an additional surface for direct conduction of heat from the heat transfer fluid to the adjustment plate and from the adjustment plate to the points of contact with the heat transfer plates.

This invention may be particularly useful in many hydrocarbon conversion processes. Catalytic reforming is one such well established hydrocarbon conversion process employed in the petroleum refining industry for improving the octane quality of hydrocarbon feedstocks, the primary product of reforming being motor gasoline. The art of catalytic reforming is well known and does not require extensive description herein. Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasoline comprised of relatively large concentrations of naphthenic and substantially straight chain paraffinic hydrocarbons, which are subject to aromatization through dehydrogenation and/or cyclization reactions. Reforming may be defined as the total effect produced by alehydrogenation of cyclohexanes and dehydroisomerization of alkylcyclopentanes to yield aromatics, alehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. No. 4,119,526 (Peters et al.); 4,409,095 (Peters); and 4,440,626 (Winter et al), the contents of which are herein incorporated by reference.

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The preferred alumina materials are known as the gamma, eta and the theta alumina with gamma and eta alumina giving the best results. An important property related to the performance of the catalyst is the surface area of the carrier. Preferably, the carrier will have a surface area of from 100 to about 500 $m^2$/g. The particles are usually spheroidal and have a diameter of from about $1/16$th to about $1/8$th inch (1.5–3.1 mm), though they may be as large as $1/4$th inch (6.35 mm). A preferred catalyst particle diameter is $1/16$th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reforming operation will employ a moving bed reaction zone and regeneration zone. The present invention is applicable to moving bed and fixed bed zones. In a moving bed operation, fresh catalyst particles are fed to a reaction zone by gravity. Catalyst is withdrawn from the bottom of the reaction zone and transported to a regeneration zone where a multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semicontinuous. By semicontinuous movement is meant the repeated transfer of relatively small amounts of catalyst at closely spaced points in time. A moving bed system has the advantage of maintaining production while the catalyst is removed or replaced.

Another preferred hydrocarbon conversion process is the alkylation of aromatic hydrocarbons. In aromatic alkylation suitable aromatic feed hydrocarbons for this invention include various aromatic substrates. Such substrates can be benzene or alkylated aromatic hydrocarbons such as toluene. The acyclic feed hydrocarbon or alkylating agent that may be used in the alkylation reaction zone also encompasses a broad range of hydrocarbons. Suitable alkylating agents include monoolefins, diolefins, polyolefins, acetylenic hydrocarbons and other substituted hydrocarbons but are preferably $C_2$–$C_4$ hydrocarbons. In the most preferred form of this invention, the alkylation agent will comprise $C_2$–$C_4$ monoolefms.

A wide variety of catalysts can be used in the alkylation reaction zone. The preferred catalyst for use in this invention is a zeolite catalyst. The catalyst of this invention will usually be used in combination with a refractory inorganic oxide binder. Preferred binders are alumina or silica. Preferred alkylation catalysts are a type Y zeolite having an alumina or silica binder or a beta zeolite having an alumina or silica binder. The zeolite will be present in an amount of at least 50 wt. % of the catalyst and more preferably in an amount of at least 70 wt. % of the catalyst.

The alkylation reaction zone can operate under a broad range of operating conditions. Temperatures usually range from 100° C. to 325° C. with the range of about 150°–275° C. being preferred. Pressures can also vary within a wide range of about 1 atmosphere to 130 atmospheres. Since liquid phase conditions are generally preferred within the reaction zone, the pressure should be sufficient to maintain the reactants in such phase and will typically fall in a range of from 10 to 50 atmospheres. Reactants generally pass through the alkylation zone at a mass flow rate sufficient to yield a liquid hourly space velocity from 0.5 to 50 hrs$^{-1}$ and especially from about 1 to 10 hrs$^{-1}$.

The alkylation zone is ordinarily operated to obtain an essentially complete conversion of the alkylating agent to monoalkylate and polyalkylate. To achieve this effect, additional aromatic substrate will usually be charged to the reaction zone. Thus, the feed mixtures are introduced into the reaction zone at a constant rate and a molecular ratio of about 1:1 to 20:1 aromatic substrate to alkylating agent with a ration of about 2:1 to 10:1 being preferred. As a result, in addition to product there will usually be a substantial amount of unreacted aromatic substrate that is removed with the product stream from the alkylation reaction zone. Additional details of aromatic alkylation processes can be found in U.S. Pat. No. 5,177,285, the contents of which are hereby incorporated by reference.

Catalytic dehydrogenation is another example of an endothermic process that advantageously uses the process and apparatus of this invention. Briefly, in catalytic dehydrogenation, a feedstock is admixed with a recycle stream comprising hydrogen and contacted with catalyst in a reaction zone. Feedstocks for catalytic dehydrogenation are typically petroleum fractions comprising paraffins having from about 3 to about 18 carbon atoms. Particular feedstocks will usually contain light or heavy paraffins. For example a usual feedstock for producing a heavy dehydrogenation products will comprise paraffins having 10 or more carbon atoms. The catalytic dehydrogenation process is particularly applicable to the treatment of hydrocarbon feedstocks containing substantially paraffinic hydrocarbons which are subject to dehydrogenation reactions to thereby form olefinic hydrocarbon compounds.

A catalytic dehydrogenation reaction is normally effected in the presence of catalyst particles comprised of one or more Group VIII noble metals (e.g., platinum, iridium, rhodium, palladium) combined with a porous carrier, such as a refractory inorganic oxide. Alumina is a commonly used carrier. The preferred alumina materials are known as the gamma, eta and theta alumina with gamma and eta alumina giving the best results. Preferably, the carrier will have a surface area of from 100 to about 500 m$^2$/g. The particles are usually spheroidal and have a diameter of from about ¹⁄₁₆th to about 1/_th inch (1.5–3.1 mm), though they may be as large as ¼th inch (6.35 mm). Generally, the catalyst particles have a chloride concentration of between 0.5 and 3 weight percent. During the course of a alehydrogenation reaction, catalyst particles also become deactivated as a result of coke deposition and require regeneration, similar to that described in conjunction with the reforming process; therefore, in preferred form, the dehydrogenation process will again employ a moving bed reaction zone and regeneration zone.

Dehydrogenation conditions include a temperature of from about 400° to about 900° C., a pressure of from about 0.01 to 10 atmospheres and a liquid hourly space velocity (LHSV) of from about 0.1 to 100 hr$^{-1}$. Generally, for normal paraffins, the lower the molecular weight the higher the temperature required for comparable conversions. The pressure in the dehydrogenation zone is maintained as low as practicable, consistent with equipment limitations, to maximize the chemical equilibrium advantages. The preferred alehydrogenation conditions of the process of this invention include a temperature of from about 400°–700° C., a pressure from about 0.1 to 5 atmospheres, and a liquid hourly space velocity of from about 0.1 to 100 hr$^{-1}$.

The effluent stream from the dehydrogenation zone generally will contain unconverted dehydrogenatable hydrocarbons, hydrogen and the products of dehydrogenation reactions. This effluent stream is typically cooled and passed to a hydrogen separation zone to separate a hydrogen-rich vapor phase from a hydrocarbon-rich liquid phase. Generally, the hydrocarbon-rich liquid phase is further separated by means of either a suitable selective adsorbent, a selective solvent, a selective reaction or reactions or by means of a suitable fractionation scheme. Unconverted dehydrogenatable hydrocarbons are recovered and may be recycled to the alehydrogenation zone. Products of the alehydrogenation reactions are recovered as final products or as intermediate products in the preparation of other compounds.

The dehydrogenatable hydrocarbons may be admixed with a diluent gas before, while, or after being passed to the dehydrogenation zone. The diluent material may be hydrogen, steam, methane, carbon dioxide, nitrogen, argon and the like or a mixture thereof. Hydrogen is the preferred diluent. Ordinarily, when a diluent gas is utilized as the diluent, it is utilized in amounts sufficient to ensure a diluent gas to hydrocarbon mole ratio of about 0.1 to about 20, with best results being obtained when the mole ratio range is about 0.5 to 10. The diluent hydrogen stream passed to the alehydrogenation zone will typically be recycled hydrogen separated from the effluent from the dehydrogenation zone in the hydrogen separation zone.

Water or a material which decomposes at dehydrogenation conditions to form water such as an alcohol, aldehyde, ether or ketone, for example, may be added to the dehydrogenation zone, either continuously or intermittently, in an amount to provide, calculated on the basis of equivalent water, about 1 to about 20,000 weight ppm of the hydrocarbon feed stream. About 1 to about 10,000 weight ppm of water addition gives best results when dehydrogenating paraffins having from 6 to 30 more carbon atoms. Additional information related to the operation of alehydrogenation catalysts, operating conditions, and process arrangements can be found in U.S. Pat. Nos. 4,677,237; 4,880,764 and 5,087,792, the contents of which are hereby incorporated by reference.

What is claimed is:

1. A reactor for controlling temperature profiles in a reaction zone, said reactor comprising:

a plurality of spaced apart heat exchange plates with each plate having an extended length and defining a boundary of a heat exchange flow channel on one side of said plate and a boundary of a reaction flow channel on an opposite side of said plate and each plate defining corrugations;

means for passing a reaction fluid through a plurality of said reaction flow channels defined by said plates along a first flow path;

means for passing a heat exchange fluid through a plurality of said heat exchange channels defined by said plates along a second flow path; and, a heat adjustment plate sandwiched between said corrugations in said heat exchange channels said heat adjustment plate defining a plurality of protrusions that project into said heat exchange channels, said protrusions having an area of projection into said heat exchange flow channels that varies over the length of said heat adjustment plate to produce varied turbulence across said channels.

2. The reactor of claim 1 wherein said first flow path is perpendicular to said second flow path.

3. The reactor of claim 1 wherein said heat adjustment plate is discontinuous and comprises a first plate section having a greater area of protrusion projection than a second plate section.

4. The reactor of claim 1 wherein said heat adjustment plate is continuous and the area said protrusions increases along one direction of said plate.

5. The reactor of claim 1 wherein the projection area of said protrusions varies by varying the number of protrusions.

6. The reactor of claim 1 wherein the projection area of said protrusions varies by varying size of said protrusions.

7. The reactor of claim 1 wherein said heat adjustment plate is perforated.

8. The reactor of claim 7 wherein said protrusions comprise bent tabs punched from said heat adjustment plate.

9. The reactor of claim 1 wherein said protrusion are on both sides of said plate.

10. The reactor of claim 1 wherein said reactor includes means for retaining catalyst in said reaction flow channels.

11. A process for controlling the temperature of a reactant stream in a chemical reaction by indirect heat exchange with a heat exchange fluid across a multiplicity of plate elements, said process comprising:

a) passing a heat exchange fluid from a heat exchange inlet to a heat exchange outlet through a first set of elongated channels formed by a first side of a plurality of heat exchange plates;

b) passing a reactant stream from a reactant inlet to a reactant outlet through a second set of channels formed by a second side of said heat exchange plates;

c) exchanging heat between said heat exchange fluid and said reactant stream by contacting said heat exchange fluid with corrugations formed by said heat exchange plates; and, d) contacting said heat exchange fluid in said heat exchange channels with a heat adjustment plate containing a plurality of protrusions to vary the heat transfer coefficient within said heat transfer channels.

12. The process of claim 11 wherein said reactor retains a heterogeneous catalyst between said heat transfer plates.

13. The process of claim 11 wherein said heat exchange fluid is passed through said heat transfer plates in a transverse flow path relative to said reactant stream.

14. The process of claim 11 wherein said protrusions increase in number through said heat exchange channel.

15. The process of claim 11 wherein said reactant stream comprises hydrocarbons.

16. The process of claim 11 wherein the average temperature of the reactant stream at the reactant inlet is within 10° F. of the average temperature of the reactant stream at the reactant outlet.

17. The process of claim 15 wherein said catalytic reaction is a reforming reaction, aromatization reaction or an aromatic alkylation reaction.

* * * * *